(12) United States Patent
Bednarski

(10) Patent No.: US 7,287,305 B2
(45) Date of Patent: Oct. 30, 2007

(54) EXTRUDED FLEXIBLE SELF-LOCKING TRIM COVER ASSEMBLY RETENTION CLIP AND METHOD FOR USING SAME

(75) Inventor: Matthew M. Bednarski, Howell, MI (US)

(73) Assignee: Intier Automotive Inc., Aurora, Ontario (CA)

( * ) Notice: Subject to any disclaimer, the term of this patent is extended or adjusted under 35 U.S.C. 154(b) by 0 days.

(21) Appl. No.: 10/391,974

(22) Filed: Mar. 18, 2003

(65) Prior Publication Data

US 2003/0213105 A1 Nov. 20, 2003

Related U.S. Application Data

(60) Provisional application No. 60/366,155, filed on Mar. 19, 2002.

(51) Int. Cl.
*A44B 21/00* (2006.01)
(52) U.S. Cl. .................. 24/297; 24/458; 297/218.3; 297/218.5; 297/452.6
(58) Field of Classification Search ............... 24/601.2, 24/297, 598.6, 546; 5/247, 408; 280/730.2, 280/728.3; 297/210.2, 452.2, 452.13, 218.3, 297/218.4, 218.5
See application file for complete search history.

(56) References Cited

U.S. PATENT DOCUMENTS

| | | | |
|---|---|---|---|
| 3,630,572 A | 12/1971 | Homier | |
| 4,603,907 A * | 8/1986 | Witzke | 297/452.56 |
| 4,867,507 A * | 9/1989 | Arai | 297/218.1 |
| 5,382,083 A * | 1/1995 | Fecteau et al. | 297/452.2 |
| 5,518,292 A * | 5/1996 | Cozzani | 297/218.5 |
| 5,605,373 A | 2/1997 | Wildern, IV et al. | |
| 5,641,552 A | 6/1997 | Tillner | |
| 5,803,484 A * | 9/1998 | Orme | 24/546 |
| 5,826,312 A * | 10/1998 | Schroder et al. | 24/601.2 |
| 5,964,017 A | 10/1999 | Roberts | |
| 6,048,025 A | 4/2000 | Tillner | |
| 6,122,806 A | 9/2000 | Umezawa et al. | |
| 6,324,732 B1 * | 12/2001 | Arisaka et al. | 24/458 |
| 6,675,449 B2 * | 1/2004 | Wales | 24/546 |

\* cited by examiner

*Primary Examiner*—Jack W. Lavinder
(74) *Attorney, Agent, or Firm*—Clark Hill PLC

(57) ABSTRACT

A clip for retaining a trim cover assembly against a foam pad of a vehicle seat including a base having a hook end and a lock end. The base also includes a flange extending out therefrom. The hook end defines a hook, which secures the trim cover assembly to the clip. The lock end includes a lock and a lock hook. The foam pad includes a pair of inner foam pad walls that define a trench, through which the clip initially passes before contacting the foam pad. The clip is inserted into the foam pad so that the lock end passes completely through the foam pad to an underlying "B" surface. The lock hook is then rotated relative to the base until the lock hook engages the flange. The clip is firmly anchored within the foam pad by the lock end, which has a width greater than the trench.

3 Claims, 3 Drawing Sheets

EXTRUDED FLEXIBLE SELF-LOCKING TRIM COVER ASSEMBLY RETENTION CLIP AND METHOD FOR USING SAME

RELATED APPLICATION

This application claims all the benefits of and priority to U.S. Provisional Application No. 60/366,155, filed Mar. 19, 2002.

BACKGROUND OF THE INVENTION

1. Field of the Invention

The invention relates to vehicle seat assemblies. More particularly, this invention is directed to a clip for retaining a trim cover assembly against a foam pad of a vehicle seat and a method for using the same.

2. Description of Related Art

Trim cover assemblies extend over vehicle seats to provide passenger comfort as well as aesthetic appeal. Passenger comfort is ensured by a secure attachment of the trim cover assembly to a foam pad layered over a vehicle seat frame. Several attachment methods and devices are known for effecting such attachment of the trim cover assembly to the foam pad. These attachment methods and devices include hog ring clips, mold-in hook fasteners, and injection-molded clips.

Hog ring clip methods require first embedding a wire into a foam pad. Next, a C-shaped metal piece is wrapped around the wire embedded in the foam pad and is threaded into an opening between a cord sewn on the inside of a trim cover. Finally, the C-shaped connector is compressed by a closure device to entrap the cord within the foam pad. Accuracy of this method depends in large part on the assembler operating the closure device.

Mold-in hook fasteners are generally suitable for attaching straight-line trim cover assemblies. However, for attaching trim cover assemblies with non-linear edges, die-cutting materials must be used, adding further costs to the attachment process. Additionally, mold-in hook fasteners provide for undesired variation in attachment stability due to the fact that proper attachment is not guaranteed each time an assembler attaches the fastener.

Injection-molded clips require considerable investment due to the intricate cavity design for the tooling. And once the tooling is available, the tools are difficult to modify due to the multi-cavity tool construction. More specifically, many or all of the tool parts require modification for each individual change. In addition, injection-molded clips require additional structural elements, such as hog ring clips, for anchoring in the foam pad.

There is a need for a cost-effective, accurate, and easy to assemble device for retaining trim cover assemblies to foam pads of a vehicle seat frame.

SUMMARY OF THE INVENTION

According to one aspect of the invention, there is provided an extruded clip that retains a trim cover assembly against a foam pad of a vehicle seat and includes a base defining a hook end and a lock end. The base also includes a flange extending out therefrom. A hook is fixedly secured to the hook end for receiving a portion of the trim cover assembly thereagainst. A lock is pivotally secured to the lock end of the base. The lock includes a lock hook for engaging the flange of the base when the lock is moved to a locking position after the clip is inserted into the foam pad of the vehicle seat.

According to another aspect of the invention, there is provided a method of using a clip to retain a trim cover assembly against a foam pad of a vehicle seat. The method involves providing a trim cover assembly and securing the trim cover assembly to a clip. The clip is then inserted through a provided foam pad. Once through the foam pad, the clip is locked to prevent the clip from pulling out of the foam pad. Finally, the trim cover assembly is pulled taut over the foam pad.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
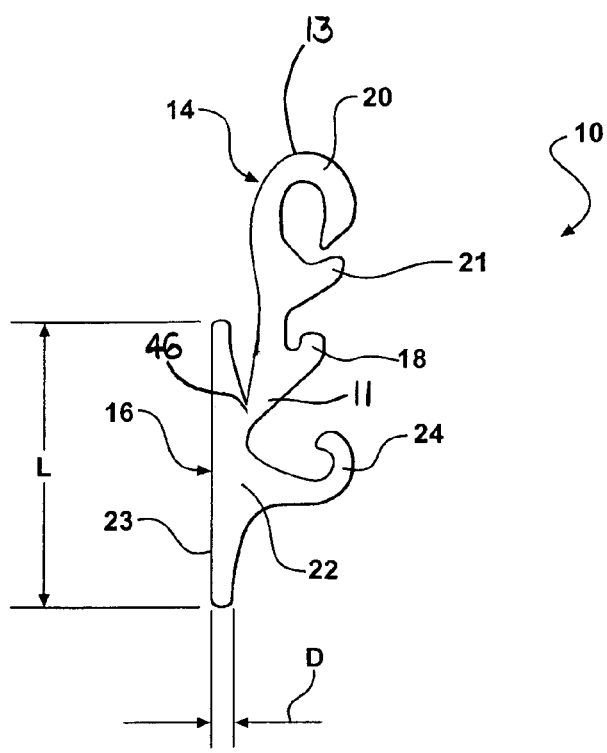
FIG. 1 is a side view of a clip according to the present invention.

Referring to FIG. 1, an extruded clip, generally indicated at 10, includes a hook end, generally shown at 14, and a lock end, generally shown at 16. The hook end 14 defines a longitudinal axis extending between opposite first and second ends 11, 13. The hook end 14 includes a fixed flange 18 projecting outwardly therefrom and defining the first end 11 and extending generally transverse to the longitudinal axis. The hook end 14 has a generally C-shaped hook 20 defining the second end 13 and a retention arm 21 formed thereon spaced generally longitudinally between the hook 20 and the flange 18. Although a hook 20 is shown, it is contemplated that the hook end 14 may have a structure formed thereon of various shapes so long as the chosen shape provides a similar securing function.

The lock end 16 includes a lock 22 pivotally secured to the first end 11 of the hook end 14 by a living hinge 46 for selective movement between an unlocked position wherein the longitudinal length of the lock end 16 is generally parallel to the longitudinal axis of the hook end 14 and a locked position wherein the longitudinal length of the lock end 16 is generally perpendicular to the longitudinal axis of the hook end. The lock end 16 includes a bottom wall 23 defining a longitudinal length L and a depth D wherein the length L is substantially larger than the depth D. The lock end 16 further includes a lock hook 24 formed thereon. The flange 18 receives the lock hook 24 when the clip 10 is rotated from an unlocked position, as shown in FIGS. 1-4, to a locked position, as shown in FIG. 5.

The clip 10 is preferably formed by extrusion tooling. Extrusion tooling allows numerous clips 10 of varying sizes to be manufactured quickly and inexpensively. As a result, the same tooling can be used to form clips 10 for use with different trim cover assemblies as well as with foam pads of varying dimensions.

Figure 2:
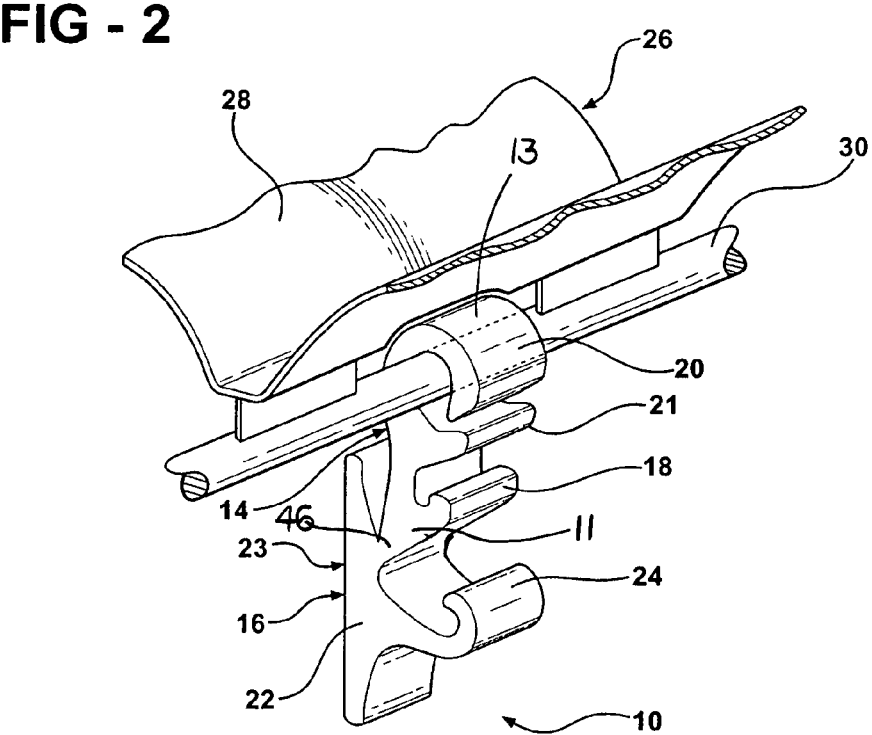
FIG. 2 is a perspective view of the clip with a trim cover assembly secured to the clip.

In operation and referring to FIG. 2, a trim cover assembly, generally shown at 26, is secured to the clip 10. The trim cover assembly 26 includes a trim cover 28 and a trim cover attachment strip 30 secured to the trim cover 28. The trim cover 28 is typically made from cloth fabric, leather, vinyl, or a similar material. The hook 20 on the hook end 14 of the clip 10 receives the trim cover attachment strip 30 and the retention arm 21 secures the trim cover assembly 26 at the hook end 14 of the clip 10.

Figure 3:
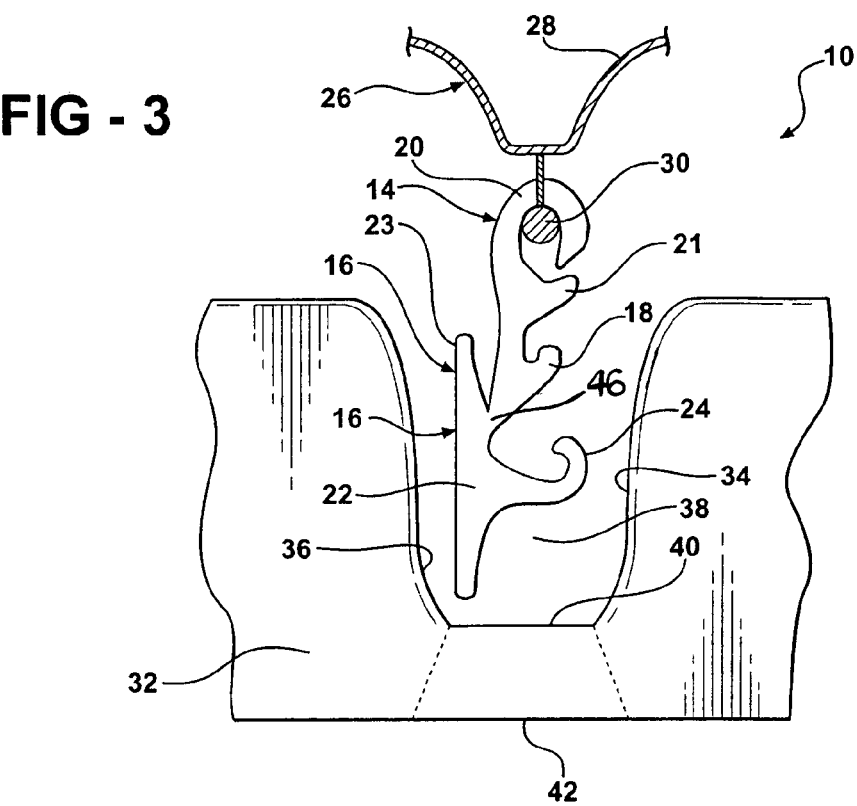
FIG. 3 is a cross-sectional, side view of a seat cushion showing the clip and the trim cover assembly positioned above a foam pad.

Referring to FIG. 3, a foam pad 32 is positioned over a vehicle seat frame (not shown). The foam pad 32 is pre-contoured or prefabricated from any of a number of well-known materials used as cushion materials, such as polyester or polyurethane. The foam pad 32 also includes a pair of inner foam pad walls 34, 36, which define a trench 38 therebetween. The foam pad 32 further includes an upper contact surface 40 and a lower contact surface 42. The upper 40 and lower 42 contact surfaces are the surfaces of the foam pad 32 that the clip 10 contacts upon entering or exiting the foam pad 32, as described below.

Figure 4:
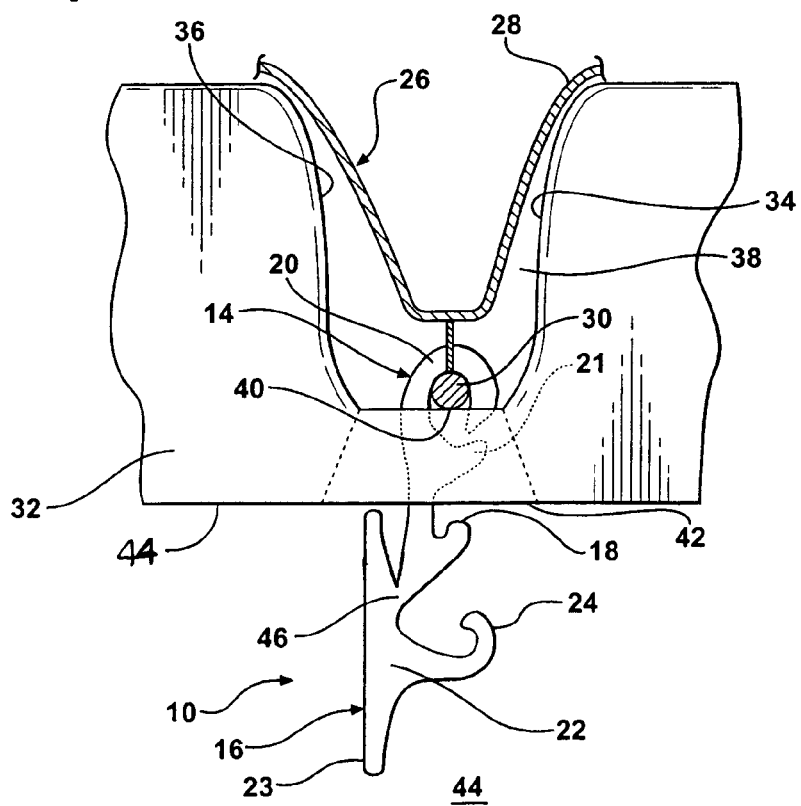
FIG. 4 is a cross-sectional, side view of a seat cushion showing the clip and the trim cover assembly inserted into the foam pad.
Figure 5:
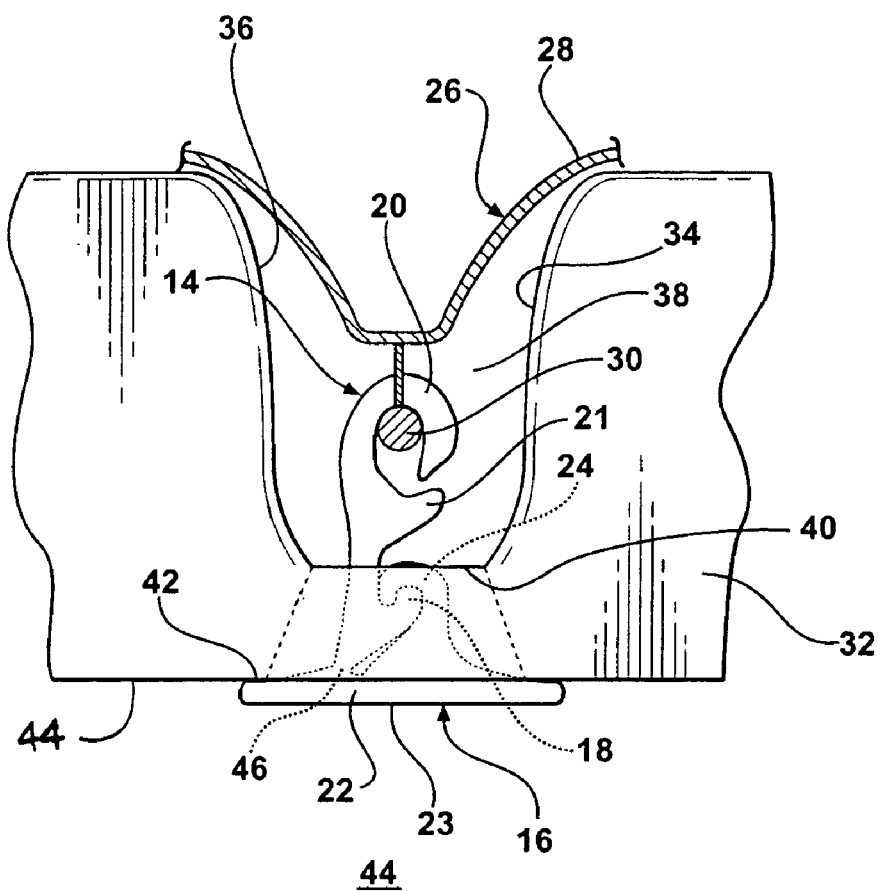
FIG. 5 is a cross-sectional side view showing the clip and the trim cover assembly inserted into the foam pad, with the clip shown in the locked position.

In FIG. 4, the clip 10 and the trim cover assembly 26, which is secured to the clip 10 by the hook 20, are inserted into the foam pad 32 at the upper contact surface 40. The clip 10 may be inserted into the foam pad 32 manually or with the use of insertion tools. The clip 10 is inserted downwardly into the foam pad 32 until the entire bottom wall 23 of the lock end 16 of the clip 10 passes completely through the lower contact surface 42 of the foam pad 32 and against a "B" surface 44 thereof. The lock end 16 is then rotated, or pivoted about the living hinge 46, relative to the hook end 14 so that the lock hook 24 engages the flange 18, as shown in FIG. 5. During this rotation step, the bottom wall 23 moves from a position generally perpendicular to the lower contact surface 42 to a position generally parallel to and abutting against the lower contact surface 42. The movement of the lock 22 firmly anchors the clip 10 within the foam pad 32 due to the fact that the length L of the lock end 16 is now greater than the width of the trench 38 at the upper contact surface 40. Thus, the clip 10 is not easily removable from the foam pad 32. After the clip 10 is in such a locked position, the trim cover 28 of the trim cover assembly 26 is pulled taut over the rest of the vehicle seat.

The method for using the clip 10 for retaining a trim cover assembly 26 against a foam pad 32 of a vehicle seat begins with securing the trim cover assembly 26 to the clip 10. Specifically, the hook 20 on the hook end 14 of the clip 10 receives the trim cover attachment strip 30 and the retention arm 21 securably retains the trim cover assembly 26 at the hook end 14 of the clip 10.

Next, the clip 10, with the trim cover assembly 26 secured to it, is inserted or pushed downwardly into the foam pad 32 at the upper contact surface 40 until the entire bottom wall 23 of the lock end 16 of the clip 10 passes completely through the lower contact surface 42 of the foam pad 32 and against the "B" surface 44.

The third step is to lock the clip 10 by pivoting the lock end 16 relative to the such that the lock hook 24 engages the flange 18. Finally, the trim cover assembly 26 is pulled taut over the vehicle seat.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A clip for retaining a trim cover assembly against a foam pad of a vehicle seat, said clip comprising:
   a hook end and a lock end, said hook end defining a longitudinal axis extending between opposite first and second ends and said lock end defining a longitudinal length;
   said hook end comprising a fixed flange projecting outwardly from said hook end defining said first end and extending generally transverse to said longitudinal axis thereof, a hook fixedly secured to said hook end and defining said second end thereof for receiving and retaining a portion of the trim cover thereagainst, and a retention arm fixedly secured to said hook end and spaced longitudinally between said hook and said flange for capturing and retaining the trim cover within said hook end between said hook and said retention arm; and
   said lock end comprising a lock pivotally secured to said first end of said hook end by a living hinge for selective movement between an unlocked position wherein said longitudinal length of said lock end is generally parallel to said longitudinal axis of said hook end and a locked position wherein said longitudinal length of said lock end is generally perpendicular to said longitudinal axis of said hook end, said lock including a lock hook for engaging said flange of said hook end when said lock is moved from said unlocked position to said locked position after said clip is inserted into the foam pad of the vehicle seat to prevent movement of said clip away from the foam pad.

2. A clip as set forth in claim 1 wherein said lock includes a bottom wall having a length defining said longitudinal length of said lock end and a depth such that said length is substantially greater than said depth such that upon movement of said lock to said locked position, said length of said bottom wall abuts the foam pad to retain said clip within the foam pad.

3. A clip as set forth in claim 2 wherein said clip is formed by extrusion tooling.

* * * * *